United States Patent [19]

Awerbuch et al.

[11] Patent Number: 4,718,236
[45] Date of Patent: Jan. 12, 1988

[54] APPARATUS AND METHOD FOR MINERAL RECOVERY FROM GEOTHERMAL AND GEOPRESSURED BRINES

[75] Inventors: Leon Awerbuch, Chevy Chase, Md.; Victor Van der Mast, Lafayette, Calif.; David P. McGrath, Waterbury, Conn.

[73] Assignee: Bechtel Power Corporation, San Francisco, Calif.

[21] Appl. No.: 808,417

[22] Filed: Dec. 12, 1985

[51] Int. Cl.$^4$ .............................................. F03G 7/04
[52] U.S. Cl. .................................. 60/641.5; 60/641.2; 60/648
[58] Field of Search ............... 60/641.2, 641.5, 646, 60/648, 657; 165/45; 122/459; 423/DIG. 19

[56] References Cited

U.S. PATENT DOCUMENTS

| | | | |
|---|---|---|---|
| 4,127,989 | 12/1978 | Mickelson | 165/45 X |
| 4,364,232 | 12/1982 | Sheinbaum | 60/641.2 |
| 4,370,858 | 2/1983 | Awerbuch et al. | 60/641.2 X |
| 4,429,535 | 2/1984 | Featherstone | 60/641.2 X |
| 4,479,351 | 10/1984 | Awerbuch et al. | 60/641.2 X |

Primary Examiner—Stephen F. Husar
Attorney, Agent, or Firm—Townsend and Townsend

[57] ABSTRACT

Improved apparatus and method in which brine of the geothermal and geopressured types is directed into one or more flash-crystallizer-separator units from a geothermal well. Such brine is separated into a gaseous fraction, a liquid fraction and a solids fraction. The gaseous fraction is used to provide useful work, such as driving a turbine, while the liquid and solids fractions are treated to remove the mineral values therefrom. The liquid fraction, following the mineral recovery therefrom, is directed back into the earth through an injection well. An important aspect of the invention is the injection of chemicals into one or more of the process vessels of the apparatus of the present invention. This causes additional mineral growth, such as the growth of heavy metal sulfide, in the brine. This is achieved by injecting sulfide ions into the brine, preferably in the form of sodium sulfide. The resulting brine slurry formed in the vessels can be sent to a thickener and then to a filter press for dewatering. The resulting filter cake contains the mineral values in the form of heavy metals, primarily lead, silver and zinc, and the filter cake can be sold to a smelter for extraction of the metals or the metals can be extracted on site.

8 Claims, 3 Drawing Figures

FIG. I
(PRIOR ART)

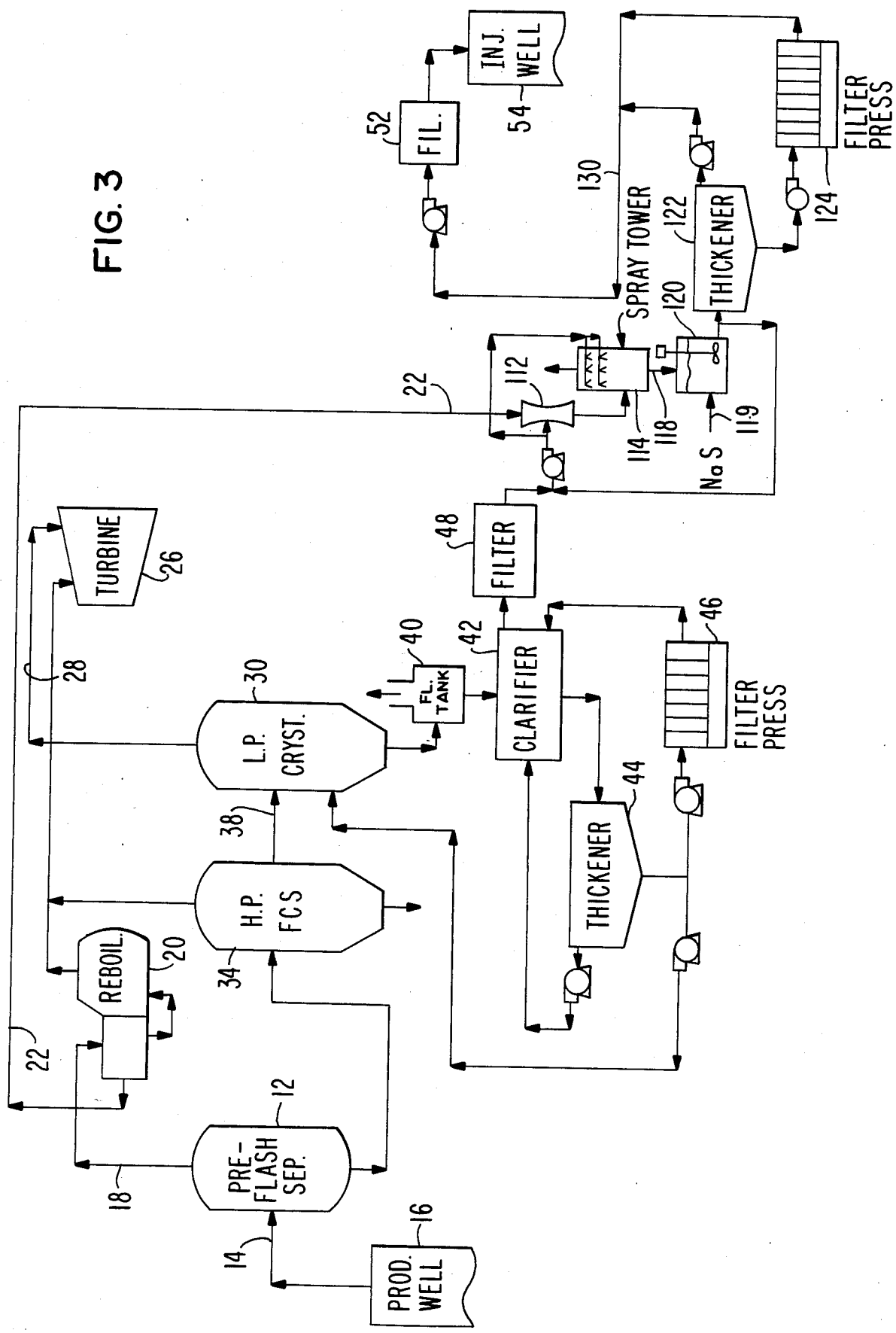

APPARATUS AND METHOD FOR MINERAL RECOVERY FROM GEOTHERMAL AND GEOPRESSURED BRINES

This invention relates to improvements in the handling of brine from geothermal wells and, more particularly, to the recovery of valuable minerals from such brines.

BACKGROUND OF THE INVENTION

Many geothermal and geopressured brines contain high concentrations of minerals which are potentially valuable. Frequently, a portion of these minerals precipitate in process equipment in a geothermal power plant as scale. Such scale must periodically be removed to allow for continued operation of the power plant. Dismantling and cleaning of process equipment is a major operating and maintenance expense for the owner of a power plant which handles brines of this type.

In U.S. Pat. No. 4,370,858, there has been disclosed an apparatus and a method for energy production and mineral recovery. The apparatus disclosed in this patent includes one or more flash-crystallizer-separator units which are used to receive brine from a geothermal production well to cause three-phase fluidization of the brine to separate it into gaseous, liquid and solid fractions. For instance, the gaseous fraction is used for performing useful work, such as driving a turbine. The liquid and solid fractions are used to support crystal growth and thereby recover mineral values from the brine. Use of an improved flash-crystallizer-separator with geothermal and geopressured brine was described in the above patent.

Improvements in mineral recovery are desirable to increase the yield of minerals, especially heavy metals such as lead, silver and zinc, from brines of the type described. A need continues to exist for such improvements, and the present invention describes an apparatus and method for promoting the additional formation of solids of commercial value which are then separated from the brine. The invention also provides a means and method for preventing scale formation in production wells.

Additional disclosures relating to the handling of geothermal and geopressured brines include U.S. Pat. Nos. 4,202,864, 4,123,506, 4,242,305 and 4,374,106.

SUMMARY OF THE INVENTION

The present invention is directed to an improved apparatus and method in which brine of the geothermal and geopressured types is directed into one or more flash-crystallizer-separator units from a geothermal well. Such brine is separated into a gaseous fraction, a liquid fraction and a solids fraction. The gaseous fraction is used to provide useful work, such as driving a turbine, while the liquid and solids fractions are treated to remove the mineral values therefrom. The liquid fraction, following the mineral recovery therefrom, is directed back into the earth through an injection well.

An important aspect of the present invention is the injection of chemicals into one or more of the process vessels of the apparatus of the present invention. This causes additional mineral growth, such as the growth of heavy metal sulfide, in the brine. This is achieved by injecting sulfide ions into the brine, preferably in the form of sodium sulfide. The resulting brine slurry formed in the vessels can be sent to a thickener and then to a filter press for dewatering. The resulting filter cake contains the mineral values in the form of heavy metals, primarily lead, silver and zinc, and the filter cake can be sold to a smelter for extraction of the metals or the metals can be extracted on site.

In another aspect of the present invention, an improvement on a conventional minerals recovery apparatus and method can be provided by removing the mineral values from the brine in the liquid fraction thereof. This is achieved by directing the liquid fraction through a Venturi scrubber and into a spray tower. Then, by injecting sulfide ions, such as sodium sulfide, into the slurry the slurry is sent to a thickener and then to a filter press for dewatering. The mineral values are then removed from the filter press in the form of a filter cake. The liquid fraction of the brine after being stripped of mineral values is returned to the earth through an injection well, all of which is environmentally clean and safe and capable of achieving a maximum return with a minimum expenditure of capital costs and maintenance expenses.

The primary object of the present invention is to provide an improved apparatus and method for handling of geothermal and geopressured brine wherein the gaseous fraction of such brines can be used for energy recovery while the liquid and solids fraction can be treated to obtain the mineral values therefrom in an improved manner to thereby provide a profitable return on investment, while minimizing capital costs and maintenance expenses.

Another object of the present invention is to provide an apparatus and method of the type described wherein, by the injection of some form of sulfide ions into the brine, heavy metal sulfide precipitation can be promoted to thereby provide for a greater yield of heavy metals, such as lead, silver and zinc, from the brine to thereby provide a more efficient means and technique for mineral recovery without effectively causing scale formation as in conventional equipment.

Another object of the present invention is to provide a method of the type described which, when practiced, prevents scale formation in a well bore.

Other objects of this invention will become apparent as the following specification progresses, reference being had to the accompanying drawings for an illustration of several embodiments of the invention.

IN THE DRAWINGS

FIG. 3 is a view similar to FIG. 2 but showing a second embodiment of the geothermal plant of the present invention showing an improvement on the power plant of FIG. 1.

Figure 1:
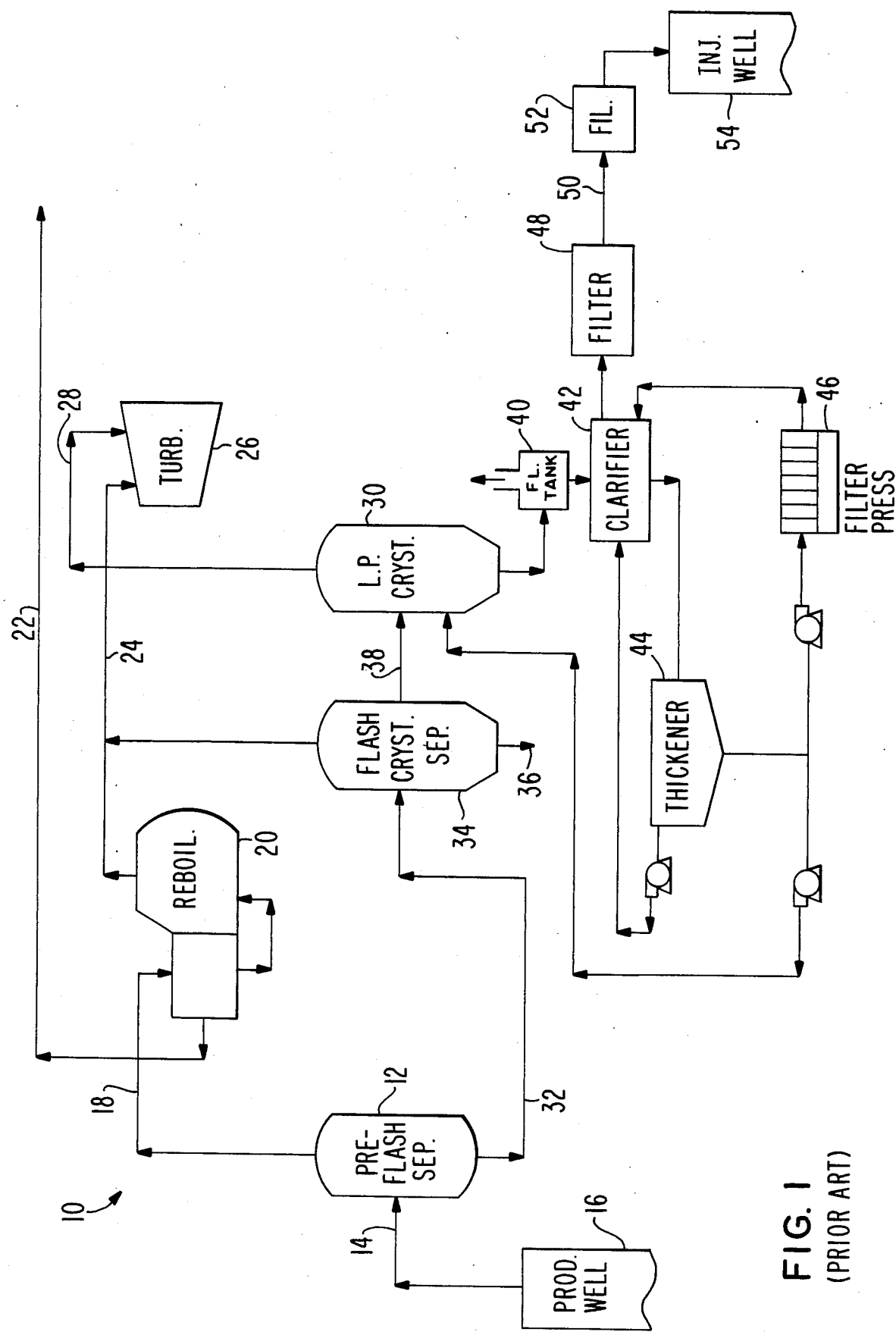
FIG. 1 is a schematic view of a conventional geothermal power plant having means for recovering metal values using high salinity brine.

A conventional geothermal power plant 10 shown in FIG. 1 is of the type shown in U.S. Pat. No. 4,370,858 and includes a preflash separator 12 coupled by a line 14 to a production well 16 from which geothermal brine is removed. The brine is preflashed in separator 12 to remove noncondensible gases, primarily $CO_2$ and $H_2S$. Typically, the preflash separator operates at 415 psia at about 446° F. In brines that contain heavy metals, such as silver, lead and zinc, heavy metal sulfides, such as lead sulfide, silver sulfide and zinc sulfide, tend to precipitate at these temperatures.

The noncondensible gases from separator 12 are directed along a line 18 to a reboiler 20 and some of the gases are then directed along a line 22 to equipment for further processing, such as to a Stretford unit, or to the atmosphere for discharge. From the reboiler, other gases are directed along a line 24 to the high pressure fluid inlet of a turbine 26 whose low pressure fluid inlet is coupled by a line 28 to the gaseous outlet of a low pressure crystallizer 30.

In the conventional plant design of FIG. 1, heavy metal sulfide precipitation is controlled by oversizing the brine line 32 from preflash separator 12 to the high pressure flash-crystallizer separator 34. The oversized brine line is periodically cleaned out to remove the scale and other formations on the inner walls of the line and thereby recover the metal sulfides. The high pressure flash-crystallizer separator 34 typically operates between 100 to 150 psi in a temperature range of 346° F. to 377° F. Iron oxide compounds will form in the crystallizing section of separator 34 at these conditions and will settle and be removed as a slurry along line 36. Thereafter, the iron oxides can be recovered. Clarified liquid leaving the settling section of the high pressure flash crystallizer separator 34 will pass along line 38 to the low pressure crystallizer 30 which operates at 30 psia at about 266° F. In this low pressure crystallizer, the bulk of the solids which are formed is silica, and the silica is removed through the bottom outlet of the crystallizer 30.

The crystallizer-separator 34 is coupled by a line 38 to low pressure crystallizer 30 and the brine outlet of crystallizer 30 is coupled to a flash tank 40, then to a reactor/clarifier 42, a thickener 44 and to a filter press 46. Clarified brine is then directed from clarifier 42 through a gravity filter 48, along a line 50 to a cartridge filter 52, and then is injected into a well 54. The filter press receives the solids containing metal values which are separated from the brine.

Figure 2:
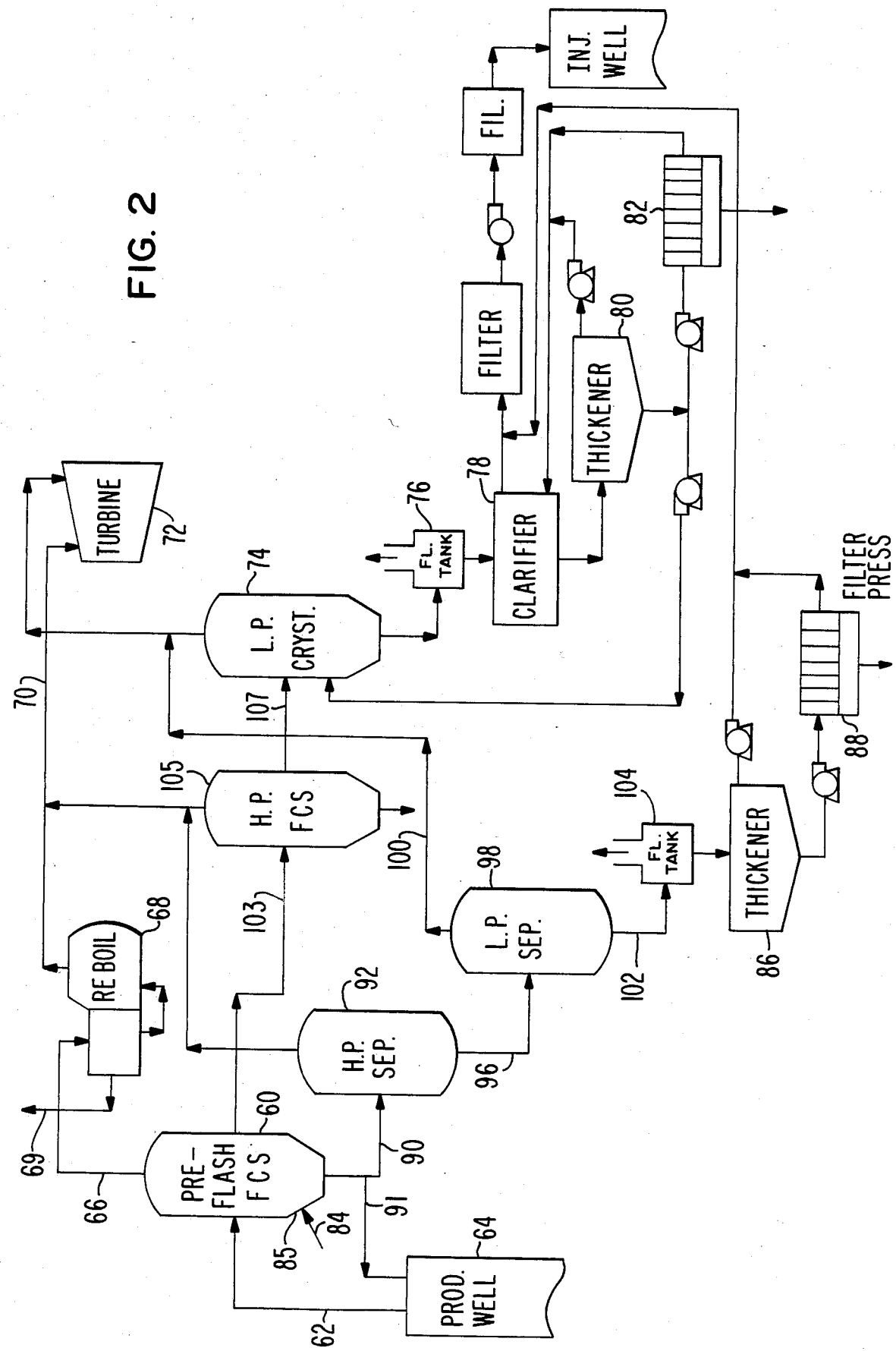
FIG. 2 is a view similar to FIG. 1 but showing one embodiment of the improved geothermal plant of the present invention.

The present invention as shown in FIG. 2 includes a flash crystallizer separator 60 coupled by a line 62 to a geothermal well 64 for receiving brine containing metal values to be recovered. Noncondensible gases are directed from separator 60, some of the gases being moveable along a line 66 to a reboiler 68 and then, along a line 70, to the high pressure inlet of a turbine 72 whose low pressure inlet is coupled to a low pressure crystallizer 74 coupled through flash tank 76, clarifier 78, thickener 80 to a filter press 82. Other gases from reboiler 68 are directed out of the latter along a line 69 for processing, such as in a Stretford unit.

Flash crystallizer separator 60 replaces the preflash separator of the FIG. 1 prior art embodiment, and some form of sulfide ions, such as sodium sulfide, is injected at line 84 to a fluid inlet 85 of flash crystallizer separator 60 and into the latter to promote additional heavy metal sulfide precipitation. The heavy metal sulfides which are formed by the injection of the materials along line 84 will settle in the flash crystallizer separator 60 and the brine slurry formed therein will be sent by way of several stages as hereinafter described to a thickener 86 and then to a filter press 88 for dewatering. The filter cake from filter press 88 can either be sold to a smelter for extraction of metals or the metals can be extracted on site.

The brine leaving the lower outlet of flash crystallizer separator 60 is directed along a line 90 to a high pressure separator 92 in which gases are separated from the brine, the gases traveling along a line 94 to line 70 for flow toward and into the fluid inlet of turbine 72. The liquid brine outlet line 96 from separator 92 is directed into a low pressure separator 98 whose gaseous line 100 is directed into the fluid inlet of low pressure crystallizer 74. The liquids outlet of low pressure separator 98 is directed along a line 102 to a flash tank 104 leading to thickener 86 and filter press 88.

To prevent scale formation in well 64, a portion of the brine flow from flash crystallizer separator 60, containing crystals, is directed into well 64 below the flash point through return line 91. A scale inhibitor can also be added to the brine to further prevent scaling in the well and bring old minerals to the surface.

A line 103 couples a brine outlet of separator 60 to a side inlet of a high pressure flash-crystallizer-separator 105, the latter having a line 107 leading from a side outlet thereof to a side inlet of low pressure crystallizer 74.

The reactions involved in the formation of heavy metal sulfides are given in Table 1 as follows:

TABLE 1

| Summary of Reactions with Equilibrium Constants | | | |
|---|---|---|---|
| | K @ 444° F. | K @ 408° F. | K @ 212° F. |
| (1) $H_2S(g) \rightleftharpoons H_2Saq$ | | | |
| (2) $H_2S(aq) \rightleftharpoons HS^- + H^+$ | $6 \times 10^{-7}$ | $5 \times 10^{-7}$ | $8 \times 10^{-8}$ |
| (3) $HS^- \rightleftharpoons S^= + H^+$ | $4 \times 10^{-8}$ | $2 \times 10^{-8}$ | $2 \times 10^{-11}$ |
| (4) $Pb^{++} + S^= \rightleftharpoons PbS$ | $5 \times 10^{-24}$ | $3 \times 10^{-24}$ | $9 \times 10^{-26}$ |
| (5) $Zn^{++} + S^= \rightleftharpoons ZnS$ | $4 \times 10^{-18}$ | $1 \times 10^{-18}$ | $1 \times 10^{-21}$ |
| (6) $2Ag^+ + S^= \rightleftharpoons Ag_2S$ | Ksp @ 25° C. $\div 8 \times 10^{-50}$ | | |
| (7) $Fe^{++} + S^= \rightleftharpoons FeS$ | $3 \times 10^{-14}$ | $1 \times 10^{-14}$ | $5 \times 10^{-16}$ |

The thermodynamics and kinetics of the reactions given in Table 1 show that adding sulfide ions to the brine will cause heavy metal sulfides to form and will not significantly increase the $H_2S$ concentration in the vapor phase. By controlling the stoichiometric amounts of sulfide added, the heavy metal sulfides can be separated in various stages of flash crystallizer separator vessels due to the difference of the solubility products of the heavy metal sulfides. For example, silver sulfide can be precipitated in the first stage, lead sulfide in the second stage, zinc sulfide in the third stage and iron sulfide in the fourth stage. Similarly, the quantity of sulfide added can be limited so that no iron sulfide, which is a less valuable material, is formed.

Another embodiment of the improved geothermal plant of the present invention is shown in FIG. 3. The plant of FIG. 3 is an improvement over the plant of FIG. 1 in that the FIG. 3 plant has means for recovering metal values from the gravity filter of the type shown in FIG. 1 and denoted by the numeral 48. Thus, components of FIG. 3 which are the same as those of FIG. 1 have the same numerals as the FIG. 1 components.

In FIG. 3, the fluid outlet of gravity filter 48 is directed to one side of a Venturi scrubber 112 which has received noncondensible gases from line 22. The outlet of Venturi scrubber 112 is directed to a spray tower 114 which receives clarified liquid along line 116, the sulfides being directed out of the scrubber 114 along line 118 in liquid form to a tank 120 coupled with a thickener 122 and a filter press 124. Sulfide ions, such as sodium sulfide, are added along a line 119 to tank 120 to promote heavy metal precipitation. Liquid can be pumped from tank 120 to thickener 122 and along line 126 back to the inlet at the side of Venturi scrubber 112. Noncondensible gases leave the spray tower 114 through line 128. The liquid outlets of thickener 122 and filter press 124 are directed along line 130 to cartridge filter 52 and to the injection well 54.

In the design shown in FIG. 3, the H$_2$S in the vent stream 22 is used to provide a portion of the required sulfide ions. This process eliminates both a costly process to dispose of the H$_2$S and reduces the quantity of sulfide ions that have to be obtained from some other source.

Alternately, a process can be used whereby (1) a preflash crystallizer separator can be used for recovery of valuable heavy metal sulfides, such as lead sulfide, silver sulfide and zinc sulfide and (2) H$_2$S to be disposed of can be reacted with brine discharged from the reactor-clarifier to form other heavy metal sulfides, such as iron sulfide. The H$_2$S can be reacted either in a scrubber, such as the Venturi scrubber shown in FIG. 3, or in any other reaction vessel. Sulfur for the processes described above can also be obtained by recovering the sulfur from the heavy metal sulfides that are produced. Other minerals can be recovered from geothermal brines as sulfates, such as barium sulfate, strontium sulfate and lithium sulfate. This recovery can be accomplished by either adding some form of sulfate ions with the sulfide ions or in a subsequent stage. These minerals can also be selectively recovered by adding stoichiometric amounts of SO$_4$ for each stage.

What is claimed:

1. Apparatus for handling a geothermal or geopressured brine having mineral values therein comprising:
    a reactor for receiving a flow of brine, said reactor being operable to flash the brine to provide a gaseous fraction, to separate the liquid fraction from the solid fraction of the brine and to cause crystallization of the particles in the solid fraction;
    means coupled with the reactor for receiving the gaseous fraction and for using such gaseous fraction to perform useful work;
    means coupled with the reactor for receiving the solid fraction separated therein from the gaseous and liquid fraction, said receiving means being operable to separate the solid and liquid fraction of the slurry from the gaseous fraction thereof;
    means for receiving the solids and liquid fraction including a dewatering means to form a filter cake containing the mineral values to be recovered;
    means for receiving the clarified liquid fraction of the reactor for removing the mineral values therefrom.

2. Apparatus as set forth in claim 1, wherein said reactor is a flash-crystallizer-separator unit.

3. Apparatus as set forth in claim 1, wherein said means for receiving the solid fraction from the reactor include a high pressure separator and a low pressure separator, each of said separators having means for separating the slurry from the gaseous fraction of the slurry, the low pressure separator being coupled to a thickener and the filter press.

4. Apparatus as set forth in claim 1, wherein is included a second reactor, there being means coupling the clarified liquid outlet of the first reactor with the second reactor, the second reactor having means for separating the clarified liquid into a slurry and a gaseous fraction, the slurry outlet of the second reactor being coupled to a mineral recovery unit.

5. A method as set forth in claim 1, wherein is included the step of injecting a scale inhibitor in the well below the flash point to bring minerals therein to the surface.

6. A method of recovering mineral values from a geothermal or geopressured brine comprising:
    directing the brine from a geothermal well into a first zone;
    separating the brine into a gaseous fraction and a slurry fraction;
    adding sulfide ions to the slurry fraction to promote heavy metal sulfide precipitation;
    directing the slurry and the precipitation out of the first zone to a second zone;
    flashing the slurry to remove the gaseous fraction therefrom before the slurry is directed to the second zone; and
    dewatering the slurry to present the mineral values to be recovered.

7. A method of recovering mineral values from a geothermal or geopressured brine comprising:
    directing the brine from a geothermal well into a first zone;
    separating the brine into a gaseous fraction and a slurry fraction;
    adding sulfide ions to the slurry fraction to promote heavy metal sulfide precipitation;
    directing the slurry and the precipitation out of the first zone to a second zone;
    dewatering the slurry to present the mineral values to be recovered;
    separating clarified liquid from the slurry in said first zone;
    directing the clarified liquid into another zone; and
    directing the clarified liquid through a third zone and recovering the mineral values as a filter cake from the third zone.

8. A method of recovering mineral value from a geothermal or geopressured brine comprising:
    directing the brine from a geothermal well into a first zone;
    separating the brine into a gaseous fraction and a slurry fraction;
    adding sulfide ions to the slurry fraction to promote heavy metal sulfide precipitation;
    directing the slurry and the precipitation out of the first zone to a second zone;
    dewatering the slurry to present the mineral values to be recovered; and
    introducing into the well a portion of the slurry fraction below the flash point to prevent scale formation in the well.

* * * * *